United States Patent Office 3,421,834
Patented Jan. 14, 1969

3,421,834
PHOSPHONIUM SALTS HAVING A REACTIVE VINYL GROUP OR A PRECURSOR THEREOF AS ANTI-STATIC AND FLAMEPROOFING AGENTS FOR CELLULOSIC MATERIALS
Martin Grayson, Norwalk, Conn., assignor to American Cyanamid Company, Stamford, Conn., a corporation of Maine
No Drawing. Filed July 29, 1963, Ser. No. 298,468
U.S. Cl. 8—120          17 Claims
Int. Cl. D06m 13/00

The present invention relates to organophosphorus compounds and to a method of preparing same. More particularly, the instant discovery concerns phosphonium salt derivatives of tertiary phosphines.

It has been found that tertiary phosphines generally will react with halo-substituted ethanol to produce the corresponding trialkyl-, tricycloalkyl-, or tri-aryl-2-hydroxyethylphosphonium salts. In turn, these salts may be acylated using a lower alkanoic anhydride, lower alkanoic acid, or the like, to produce their corresponding triaalkyl-, tricycloalkyl, or triaryl-2-acetoxyethylphosponium salts.

The following equations illustrate this general reaction:

(A)
$$R^1R^2R^3P + XCH_2CH_2OH \longrightarrow R^1R^2R^3\overset{\oplus}{P}CH_2CH_2OH \cdot \overset{\ominus}{X}$$

(B)
$$R^1R^2R^3\overset{\oplus}{P}CH_2CH_2OH \cdot \overset{\ominus}{X} + \text{esterifying agent} \longrightarrow$$
$$R^1R^2R^3\overset{\oplus}{P}CH_2CH_2OY \cdot \overset{\ominus}{X}$$

$R^1$, $R^2$, $R^3$ each representing, as will be seen hereinafter alkyl, cycloalkyl and aryl;
X representing halogen or tetraphenyl borate, and Y representing the residue of an acylating or esterifying agent.

The following is a typical embodiment of generic Equations A and B, above;

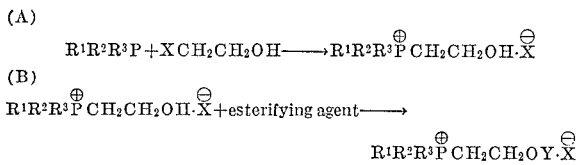

The trialkyl-, tricycloalkyl- and triaryl- 2-acetoxyethylphosphonium salts prepared as above may, in turn, be converted to their corresponding vinylphosphonium salts according to the following general equation:

(C)
$$R^1R^2R^3\overset{\oplus}{P}CH_2CH_2OR \cdot \overset{\ominus}{X} \xrightarrow{\text{base}} R^1R^2R^3\overset{\oplus}{P}CH=CH_2 \cdot \overset{\ominus}{X}$$

in which $R^1$, $R^2$, $R^3$, Y and X are the same as above.
The following is a typical embodiment of Equation C, above:

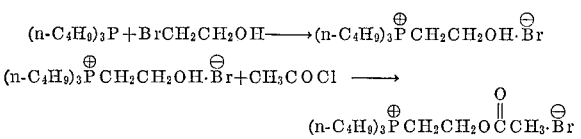

More specifically, in generic Equations A, B and C, above, $R^1$, $R^2$ and $R^3$ each represent alkyl $C_1$-$C_{16}$, substituted alkyl $C_1$-$C_{16}$, cycloalkyl, and aryl; X represents halogen, such as bromo, chloro and iodo, and tetraphenyl borate; and Y in Equations B and C represents the residue of an acylating agent as shown in the specific embodiments, supra.

Typical teritary phosphine reactants are the following: trimethylphosphine, triethylphosphine, tripropylphosphine, tributylphosphine, tripentylphosphine, trihexylphosphine, triheptylphosphine, trioctylphosphine, trinonylphosphine, tridecylphosphine, triundecylphosphine, tridodecylphosphine, tritridecylphosphine, tritetradecylphosphine, tripentadecylphosphine, trihexadecylphosphine, dodecyldiethylphosphine, dioctylpropylphosphine, diethylbutylphosphine, butylethylhexylphosphine, tri(2-methoxypentyl)phosphine, tris-2-cyanoethylphosphine, diethyl-2-ethoxyheptylphosphine, tricyclopropylphosphine, tricyclohexylphosphine, triphenylphosphine, diphenylnaphthylphosphine, trixylylphosphine, tritolylphosphine, tris(para-ethoxyphenyl)phosphine, tris(para - chlorophenyl(phos - phine tris(2 - chlorophenyl)phosphine, tris(3 - bromophenyl)phosphine, and the like.

Typical esterifying agents follow: lower alkonoic anhydrides, such as acetic anhydride, propionic anhydride, butanoic anhydride; lower alkanoic acids, such as formic acid, acetic acid, propionic acid, butanoic acid; acylating ($C_2$-$C_{18}$ alkanoyl) halides, such as acetyl chloride, propionyl bromide, butyryl iodide, octanoyl chloride, dodecanoyl bromide, stearyl chloride, hexanoyl bromide; isopropenyl acetate; aryl sulfonyl halides, such as paratoluenesulfonyl chloride, phenyl sulfonyl bromide, 2,4-dimethylphenysulfonyl chloride; alkyl (lower) chloroformates, such as ethylchloroformate, butylchloroformate; alkyl (lower) carbonates, such as diethylcarbonate, dipropylcarbonate, dibutylcarbonate; ketene; dimethyl sulfate; nitrosyl chloride; and trimethylphosphate.

In Equation C, above, typical suitable inorganic and inorganic bases are: alkali metal hydroxides, such as sodium hydroxide, potassium hydroxide, lithium hydroxide; alkali metal carbonates, such as sodium carbonate, potassium carbonate, lithium carbonate; alkaline earth metal hydroxides, such as magnesium hydroxide, barium hydroxide, calcium hydroxide; alkaline earth metal carbonates, such as magnesium carbonate, barium carbonate, calcium carbonate; activated alumina; and quaternary ammonium hydroxide, such as tetraalkyl (lower) ammonium hydroxides, including tetramethylammonium hydroxide, tetrapropylammonium hydroxide, and tetrabenzylammonium hydroxide; and basic ion exchange resins.[1]

The reaction in Equation A hereinabove is carried out at a temperature in the range of 30° C. to 250° C., preferably 60° C. to 180° C. The Equation B reaction, above, is best carried out at a temperature in the range of 5° C. to 150° C. As to Equation C, above, this reaction is generally carried out at a temperature in the range of 20° C. to 180° C., preferably 50° C. to 150° C.

Each of these three reactions may be carried out at atmospheric, sub-atmospheric or super-atmospheric pressure; preferably, however, reaction is carried out at atmospheric pressure. By the same token, the ratio of the reactants in each of Equations A, B and C is not critical, an excess of either reactant, in each equation, with respect to the other being suitable. In Equation B, however, an excess of about 10% by weight of the acrylating agent relative to the phophonium salt reactant is preferred. Generally in Equations A and C stoichiometric amounts of the reactants are employed.

The reactions of Equation A, above, are best carried out in the presence of an inert organic solvent, i.e., a solvent which does not enter into or otherwise interfere with the reaction under the conditions contemplated herein. Typical solvents are dimethoxyethane, dioxane, ethylacetate, tetrahydrofuran, and the like.

The reactions of Equation B similarly are best carried out in the presence of an inert organic solvent of the type described for Equation A, as well as acetic acid, dimethylformamide, diglyme, and the like.

---
[1] Typical are: polymeric qaurternary ammonium salts, e.g., polymeric trimethylbenzyl ammonium chloride, etc.

As to Equation C, typical suitable inert organic solvents in which the phosphonium salt is solvent, which solvents do not interfere or enter into reaction to any substantial degree, are dimethoxyethane, dioxane, dimethylformamide, diglyme, acetonitrile, ethylacetate, tetrahydrofuran, and other like linear and cyclic ethers, acetate esters (lower alkyl).

Alternatively, it has been found pursuant to the instant discovery that the products of Equation A, above, may be converted directly to the products of Equation C, thusly, (D) 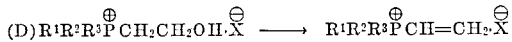

in the presence of any base given above for Equation C and at a temperature in the range of 100° C. to 250° C. As in Equation C, a solvent of the type given hereinabove for Equation C is suitable and herein contemplated. If desired, the reaction may be carried out in the presence of a dehydrating agent, such as a siliceous agent including silica (e.g. silica gel), silica-alumina, and the like, in which other inert organic solvents are also suitable, e.g. aromatic hydrocarbons, such as toluene, benzene, xylene, cymene, and the like, methylene chloride, ethylene chloride, etc.

The products of Equations A, B, C and D above are useful as fire retardants in plastics, e.g., from 0.5 to 30 parts by weight of any one of above compounds when incorporated into 100 parts by weight of a thermoplastic polymer material, such as polyethylene, polypropylene, polystyrene, polyacrylate, polymethylmethacrylate, or the like, provides enhanced fire retardance to the polymer material upon exposure to an open flame.

While the following examples specify certain details as to certain embodiments of the present invention, it is not intended that these details impose unnecessary limitations upon the scope of the instant discovery, excepting of course that these limitations appear in the appended claims.

EXAMPLE I

Tributyl-2-hydroxyethylphosphonium tetraphenylborate

Tributyl - 2 - hydroxyethylphosphonium bromide, obtained from combining tributylphosphine and 2-bromoethanol in 1,2-dimethoxyethane and refluxing under nitrogen, is dissolved in water and treated with excess 0.1 N sodium tetraphenylboron. The resulting precipitate is filtered and recrystallized from ethanol to yield product tributyl-2-hydroxyethylphosphonium tetraphenylborate with melting point 124° C.–125° C.

Analysis of product.—Found: C, 80.03; H, 9.00; P, 5.35. $C_{38}H_{52}O$ requires: C, 80.55; H, 9.25; P, 5.47%.

As is evident from this example, the halide salts of Equation A may be converted, in situ or after recovery thereof, to the corresponding tetraphenylborate salts.

EXAMPLE II

Tributyl-2-acetoxyethylphosphonium bromide 1,2-dimethoxyethane (275 milliliters), freshly distilled from calcium hydride, 2-bromoethanol (133 grams, 1.06 moles), and tributylphosphine (204 grams, 1.01 moles) are combined under nitrogen and refluxed at 85° C. overnight with stirring. A heavy oil forms within an hour. Isopropenyl acetate (320 grams, 3.2 moles) and 48% HBr (3 drops) are slowly added to the reaction mixture which is then refluxed 18 hours. Volatile components are removed in vacuo at 70° C. Product (372.5 grams; 99.9% yield) remains as a thick hydroscopic oil, which could be forced to crystallize by stirring in a benzene-petroleum ether (boiling point 30° C.–60° C.) mixture. Crystalline tributyl-2-acetoxyethylphosphonium salt is obtained from part of the oily product by freeze drying a benzene solution of the oil.

EXAMPLE III

Tributyl-2-acetoxyethylphosphonium tetraphenylborate

Tributyl-2-acetoxyethylphosphonium bromide oil (16.2 grams produced as in Example II, above) is dissolved in water and treated with sodium tetraphenylboron (15 grams) dissolved in water. A white precipitate appears which is filtered and recrystallized from ethanol containing enough acetonitrile to cause solution at the boiling point of the mixture. Tributyl-2-acetoxyethylphosphonium tetraphenylborate (16.7 grams) is obtained with melting point of 177° C.–179° C.

Analysis of product.—Found: C, 76.65; H, 8.83; P, 5.24. $C_{40}H_{54}O_2BP$ requires: C, 78.93; H, 8.94; P, 5.10%.

EXAMPLE IV

Triphenyl-2-acetoxyethylphosphonium iodide 2-iodoethyl acetate is prepared from the nucleophilic exchange reaction of sodium iodide and 2-chloroethylacetate in refluxing acetone under nitrogen (boiling point 86° C.–90° C. at 33 milliliters mercury). Triphenylphosphine (7.35 grams) is reacted with 2-iodoethylacetate (24 grams) under nitrogen with stirring at 80° C. for 4.5 hours. The excess 2-iodoethylacetate is distilled off in vacuo. Crude, brown crystalline product (14.20 grams) is obtained by washing oily residue with ether. It is washed with ether, ethylacetate, and acetone and recrystallized from acetonitrile to give product (7.90 grams) with melting point 161° C.–163° C.

Analysis of product.—Found: C, 55.16; H, 4.80; I, 26.77; P, 6.45. $C_{22}H_{22}O_2IP$ requires: C, 55.47; H, 4.66; I, 26.66; P, 6.51%.

Example IV represents still another embodiment of the present invention wherein the product salts of Equation B, above, are prepared directly from the reaction of a 2-haloethyl acetate with a tertiary phosphine of the type contemplated herein.

The process of Example IV, above, may be carried out using any of the tertiary phosphine reactants contemplated herein and the corresponding tri-substituted-2-acetoxyethylphosphonium halide produced and recovered, according to the following equation (E)

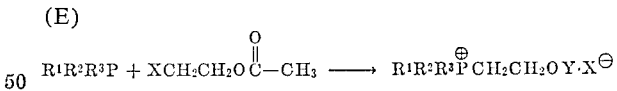

wherein $R^1$, $R^2$, $R^3$, X and Y have the meanings given hereinabove in Equations A and B.

Equation E is best carried out at a temperature in the range of 5° C. to 150° C., preferably at the reflux temperature of the solvent employed. Typical inert organic solvents contemplated for Equation E are acetone, lower alkanol (ethanol, butanol), plus the solvents listed hereinabove for Equation C. The reaction under Equation E, as shown in Example IV, supra, is best carried out under inert conditions, such as under nitrogen. Other 2-haloethyl acetate reactants contemplated herein are 2-bromoethyl acetate and 2-chloroethyl acetate.

Tables A, B, C, D and E, which follow, correspond to Equations A, B, C, D and E, respectively. The examples in Tables A and B are carried out essentially as in Examples I and II, respectively, supra, excepting of course as shown in Tables A and B. The examples in Table C are carried out essentially as in Example LX, infra, excepting of course as shown in Table C. Likewise, the products of Table D are recovered essentially as in Example LX, infra. The examples in Table E are carried out essentially as in Example IV, supra, excepting of course as shown in Table E.

3,421,834

TABLE A $$R^1R^2R^3P + XCH_2CH_2OH \xrightarrow{(A)} R^1R^2R^3\overset{\oplus}{P}CH_2CH_2OH \cdot \overset{\ominus}{X}$$

| Example No. | R¹ | R² | R³ | Moles R¹R²R³P | X | Moles XCH₂CH₂OH | Solvent | Milliliters of Solvent | Temp., °C. | Product |
|---|---|---|---|---|---|---|---|---|---|---|
| V | CH₃ | CH₃ | CH₃ | 1 | Br | 1.0 | DME¹ | 1,500 | 70 | 2-hydroxyethyltrimethylphosphonium bromide. |
| VI | n-C₄H₉ | n-C₄H₉ | n-C₄H₉ | 1 | Cl | 1.0 | DME | 1,500 | 83 | 2-hydroxyethyltributylphosphonium chloride. |
| VII | n-C₄H₉ | n-C₄H₉ | n-C₄H₉ | 1 | I | 1.2 | Dioxane | 1,200 | 101 | Do. |
| VIII | n-C₄H₉ | n-C₄H₉ | n-C₄H₉ | 1 | I | 1.2 | do | 2,000 | 101 | 2-hydroxyethyltributylphosphonium iodide. |
| IX | i-C₄H₉ | i-C₄H₉ | i-C₄H₉ | 1 | Cl | 0.9 | Ethyl acetate | 1,800 | 50 | 2-hydroxyethyltriisobutylphosphonium chloride. |
| X | n-C₈H₁₇ | n-C₈H₁₇ | n-C₈H₁₇ | 1 | Cl | 1.1 | DME | 1,700 | 83 | 2-hydroxyethyltrioctylphosphonium chloride. |
| XI | n-C₁₂H₂₅ | n-C₁₂H₂₅ | n-C₁₂H₂₅ | 1 | Cl | 1.1 | DME | 1,600 | 83 | 2-hydroxyethyltridodecylphosphonium chloride. |
| XII | n-C₁₆H₃₃ | n-C₁₆H₃₃ | n-C₁₆H₃₃ | 1 | Cl | 1.3 | THF² | 1,600 | 30 | 2-hydroxyethyltrihexadecylphosphonium chloride. |
| XIII | C₂H₅ | C₂H₅ | C₂H₅ | 1 | Cl | 1.0 | Dioxane | 1,700 | 200 | 2-hydroxyethyltriethylphosphonium chloride. |
| XIV | C₂H₅ | C₂H₅ | C₆H₁₃ | 1 | Cl | 1.1 | Ethyl acetate | 2,000 | 45 | 2-hydroxyethylbutylethylhexylphosphonium chloride. |
| XV | C₂H₅ | C₂H₅ | C₂H₅O—CH₂—CH₂ | 1 | Cl | 1.2 | Dioxane | 1,800 | 75 | 2-hydroxyethyldiethyl-2-ethoxyethylphosphonium chloride. |
| XVI | 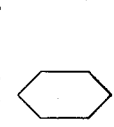 | 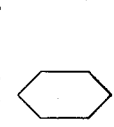 | 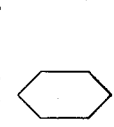 | 1 | Br | 1.3 | DME | 1,600 | 60 | 2-hydroxyethyltricyclohexylphosphonium bromide. |
| XVII | 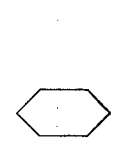 | 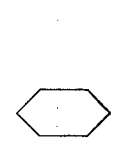 | 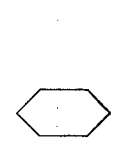 | 1 | Cl | 0.9 | DME | 2,000 | 80 | 2-hydroxyethyltricyclopentylphosphonium chloride. |
| XVIII | 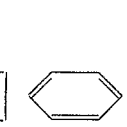 | 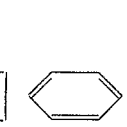 | 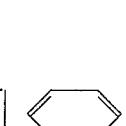 | 1 | I | 1.1 | Dioxane | 1,500 | 90 | 2-hydroxyethyldiphenylnaphthylphosphonium iodide. |
| XIX | 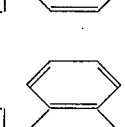 | 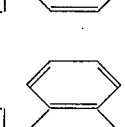 | 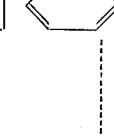 | 1 | I | 1.0 | do | 2,000 | 101 | 2-hydroxyethyltriphenylphosphonium iodide. |
| XX | 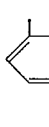 | 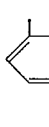 | 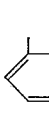 | 1 | Cl | 1.2 | Ethyl acetate | 1,600 | 65 | 2-hydroxyethyltri(para-chlorophenyl)phosphonium chloride. |
| XXI | 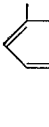 | 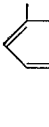 | 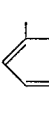 | 1 | Cl | 1.3 | DME | 1,700 | 83 | 2-hydroxyethyltri(para-tolyl)phosphonium chloride. |

¹ DME = Dimethoxyethane.
² THF = Tetrahydrofuran.

TABLE B $$R^1R^2R^3\overset{\oplus}{P}CH_2CH_2OH\cdot X^{\ominus} + A \xrightarrow{(B)} R^1R^2R^3\overset{\oplus}{P}CH_2CH_2OY\cdot X^{\ominus}$$

| Example No. | Product of Example No. | Moles $R_3\overset{\oplus}{P}CH_2CH_2OH\cdot X^{\ominus}$ | A | Moles A | (B) Solvent Milliliters (ml.) | Temp., °C. | Product |
|---|---|---|---|---|---|---|---|
| XXII | V | 1.0 | Isopropenyl acetate | 3.2 | DME, 300 ml | 83 | 2-acetoxyethyltrimethyl phosphonium bromide. |
| XXIII | VI | 1.0 | Dimethyl sulfate | 3.8 | Dioxane, 300 ml | 90 | 2-methylsulfatoethyltributyl phosphonium chloride. |
| XXIV | VII | 0.8 | Acetic anhydride | 1.0 | Acetic acid, 300 ml | 120 | 2-acetoxyethyltributyl phosphonium chloride. |
| XXV | VIII | 0.9 | Nitrosyl chloride | 1.1 | Diglyme | 120 | 2-nitroethyltributyl phosphonium iodide. |
| XXVI | IX | 1.0 | Acetyl chloride | 1.2 | DME, 500 ml | 30 | 2-acetoxyethyltriisobutyl phosphonium chloride. |
| XXVII | X | 1.0 | p-Toluenesulfonyl chloride | 1.0 | DME, 200 ml | 60 | 2-(p-toluenesulfonyloxy)-ethyltridodecyl phosphonium chloride. |
| XXVIII | XI | 1.0 | Trimethyl phosphate | 1.1 | Acetic acid, 500 ml | 80 | 2-dimethylphosphatoethyl-triethyl phosphonium chloride. |
| XXIX | XII | 2.4 | Propionic acid | 1.1 | DMF, 1,300 ml | 10 | 2-propionyloxyethyltrihexadecyl-phosphonium chloride. |
| XXX | XIII | 1.0 | Butanoic anhydride | 1.0 | DMF, 1,000 ml | 30 | 2-butyryloxyethyltributylethyl-hexylphosphonium chloride. |
| XXXI | XIV | 0.8 | Acetic acid | 4.0 | None | 118 | 2-acetoxyethyldiethyl-2-ethoxyethylphosphonium bromide. |
| XXXII | XV | 0.9 | Acetyl chloride | 1.0 | DME, 200 ml | 65 | 2-acetoxyethyltricyclo-hexylphosphonium chloride. |
| XXXIII | XVI | 1.0 | Hexanoyl chloride | 1.9 | Dioxane, 150 ml | 25 | 2-hexanoyloxyethyltricyclo-pentylphosphonium chloride. |
| XXXIV | XVII | 1.0 | Acetic anhydride | 6.0 | None | 100 | 2-acetoxyethyltriphenyl phosphonium iodide. |
| XXXV | XVIII | 1.1 | Stearyl chloride | 1.1 | DMF, 700 ml | 50 | 2-stearyloxyethyldiphenyl-naphthylphosphonium iodide. |
| XXXVI | XX | 1.0 | Dodecanoyl bromide | 4.0 | DMF, 1,000 ml | 40 | 2-dodecanoyloxyethyltri(para-chlorophenyl)phosphonium chloride. |
| XXXVII | XXI | 1.0 | Phenylsulfonyl bromide | 1.0 | Dioxane, 600 ml | 65 | 2-(phenylsulfonyloxy)ethyltri-(para-tolyl)phosphonium chloride. |
| XXXVIII | V | 2.0 | Ethylchloroformate | 2.0 | Diglyme, 300 ml | 40 | 2-(ethyoxycarbonyloxy)ethyl-trimethyl phosphonium bromide. |
| XXXIX | VI | 0.9 | Dipropyl carbonate | 3.0 | DME, 250 ml | 100 | 2-(propoxycarbonyloxy)ethyl-tributylphosphonium chloride. |
| XL | VII | 1.0 | Ketene | 1.0 | THF, 500 ml | 75 | 2-acetoxyethyltributyl phosphonium chloride. |

¹ DMF = Dimethylformamide.

TABLE C $$R^1R^2R^3\overset{\oplus}{P}CH_2CH_2OY\cdot X^{\ominus} + Base \rightarrow R^1R^2R^3\overset{\oplus}{P}CH=CH_2\cdot X^{\ominus}$$

| Example No. | Product of Example No. | Moles of $R^1R^2R^3\overset{\oplus}{P}CH_2CH_2OY\cdot X^{\ominus}$ | Base | Moles of Base | Solvent¹ Milliliters (ml.) | Temp., °C. | Product |
|---|---|---|---|---|---|---|---|
| XLI | XXII | 1.0 | $K_2CO_3$ | 1.0 | DME, 300 ml | 83 | Vinyltrimethylphosphonium bromide. |
| XLII | XXIII | 1.0 | $Na_2CO_3$ | 2.0 | Dioxane, 300 ml | 100 | Vinyltributylphosphonium chloride. |
| XLIII | XXIV | 1.0 | $Li_2CO_3$ | 4.0 | Ethyl acetate, 500 ml | 80 | Do. |
| XLIV | XXV | 2.0 | $Mg(CO_3)_2$ | 8.0 | Diglyme | 100 | Vinyltributylphosphonium iodide. |
| XLV | XXVI | 0.5 | $Ba(OH)_2$ | 1.0 | Acetonitrile, 500 ml | 80 | Vinyltriisobutylphosphonium chloride. |
| XLVI | XXVII | 1.0 | $Ca(OH)_2$ | 1.1 | THF, 600 ml | 60 | Vinyltridodecylphosphonium chloride. |
| XLVII | XXVIII | 1.0 | Polymeric trimethyl benzyl ammonium chloride | 4.0 | DMF, 400 ml | 85 | Vinyltriethylphosphonium chloride. |
| XLVIII | XXIX | 1.0 | KOH | 1.0 | THF | 150 | Vinyltrihexadecylphosphonium chloride. |
| XLIX | XXX | 1.0 | NaOH | 1.0 | Acetonitrile | 20 | Vinylbutylethylhexylphosphonium chloride. |
| L | XXXI | 1.0 | LiOH | 1.0 | do | 60 | Vinyldiethyl-2-ethoxy-ethylphosphonium chloride. |
| LI | XXXII | 1.0 | $Mg(OH)_2$ | 3.0 | THF | 72 | Vinyltricyclohexyl-phosphonium bromide. |
| LII | XXXIII | 2.0 | $Ca(CO_2)$ | 1.0 | Dioxane | 180 | Vinyltricyclopentyl-phosphonium chloride. |
| LIII | XXXIV | 0.5 | $Ba(CO_2)$ | 1.0 | DME | 81 | Vinyltriphenylphosphonium iodide. |
| LIV | XXXV | 3.0 | Polymeric triethylbenzyl ammonium hydroxide | 5.0 | Dioxane | 97 | Vinyldiphenylnaphthyl-phosphonium iodide. |
| LV | XXXVI | 1.0 | do | 1.0 | DME | 50 | Vinyltri(para-chloro-phenyl) phosphonium chloride. |
| LVI | XXXVII | 1.0 | Activated alumina | 1.7 | THF | 35 | Vinyltri(para-tolyl) phosphonium chloride. |
| LVII | XXXVIII | 1.0 | Tetramethyl-ammonium hydroxide | 1.0 | DME | 42 | Vinyltrimethylphosphonium bromide. |
| LVIII | XXXIX | 2.0 | Tetrapropyl-ammonium hydroxide | 1.0 | Diglyme | 37 | Vinyltributylphosphonium chloride. |
| LIX | XL | 1.0 | Tetrabenzyl-ammonium hydroxide | 1.0 | DME | 25 | Do. |

¹ When not specified the amount of solvent employed is 500 milliliters.

The products of equations and Tables B, C, D and E hereinabove may be reacted, pursuant to the present invention, with a cellulosic material, such as cotton, linen, wood, paper, rayon, and the like, in order to provide flame resistance and anti-static properties to these materials.

For instance, a swatch of cotton can be treated with a small amount of any one of the products of Equations B, C, D and E hereinabove in order to impart flame retardance and anti-static properties to the cotton. Cotton (cellulose) thus treated significantly resists inflammation when contacted with an open flame as well as stationary charges of electricity, i.e., static electricity.

The cellulosic material is best treated using an aqueous solution containing 10% to 50% by weight of phosphonium salt, based on the dried weight of the cellulose, said solution also containing preferably from 1% to 5% of dilute alkali, based upon the dried weight of the phosphonium salt. Typical alkalis are potassium hydroxide, sodium hydroxide, lithium hydroxide, potassium carbonate, sodium carbonate, lithium carbonate, and the like.

A swatch of cloth or a strip of wood or paper may be treated with any one of these aqueous solutions by padding the swatch or strip, by spraying same, by dipping same in the solution, by pouring the solution on the sample, or by any other similar convenient method. Following treatment, the swatch or strip may be allowed to soak up the treating agent for, say, one minute to an hour or more.

Application of the treating agent is generally carried out at room temperature, but elevated temperatures up to about 100° C. are suitable. After the soaking period just mentioned, the swatch or strip is preferably dried at elevated temperatures up to about 120° C., yet the sample can be dried at room temperature allowing, of course, for a substantially longer drying period.

Once having dried the swatch or strip it is best to cure same for a short period of time using temperatures in the range of, preferably, 100° C. to 150° C. As in the case of drying, curing may be extended over a longer period of time using a substantially lower temperature or a shorter period of time using higher (e.g., up to 200° C.) temperatures.

There is nothing particularly difficult about applying the treating agent to the cellulosic sample and the skilled chemist will appreciate that the processes just suggested admit of substantial modifications and variations within the purview of the instant discovery. Samples treated as just described generally contain anywhere from 1% to about 25%, preferably 5% to about 10%, treating agent, viz, phosphonium salt, subsequent to the curing step. Preferably, swatches or strips of samples about five inches long and two inches wide are employed to test the efficacy of the treating agents hereinbefore defined.

The present invention will best be understood from the following examples which are merely intended to illustrate but not unnecessarily limit the instant discovery.

EXAMPLE LX

Tributylvinylphosphonium bromide+cellulose

Tributylvinylphosphonium bromide is applied to cotton (cellulose) fabric (2 inches by 5 inches) by means of padding employing 4% sodium hydroxide, based on concentration of solid phosphonium salt in solution, as catalyst. The treated fabric is dried two minutes at 107° C. and cured 1.5 minutes at 177° C. Percentage of tributylvinylphosphonium bromide initially on the cellulose is 6.1%; after boiling fabric in water for 30 minutes 2.9% is on the cellulose.

EXAMPLE LXI

Example LXI, above, is repeated in every essential respect with the exception that tridodecyl-2-acetoxyethylphosphonium bromide is used as the phosphonium salt treating agent and lithium carbonate as the dilute alkali catalyst.

EXAMPLE LXII

A strip of wood (redwood), two inches wide, five inches long, and one-quarter inch thick is sprayed with an aqueous solution containing 20% tricyclohexyl-2-acetoxyethylphosphonium iodide, based upon the dried weight of the wood, and 3% potassium hydroxide, based on the dry weight of the salt. Spraying is carried out at room temperature (23° C.) and continued until all surfaces of the wood are moist. The strip of wood is then permitted to dry at 80° C. for 40 minutes, after which it is cured in an oven at a temperature of about 130° C.

EXAMPLE LXIII

A swatch of linen two inches by five inches is dipped into an aqueous solution containing 10% by weight, based on the dry weight of the linen, of vinyltri(para-chlorophenyl)phosphonium chloride, the solution containing 5% by weight of sodium carbonate, based upon the dry weight of the phosphonium salt. The linen swatch is then permitted to soak up the treating agent for ten minutes, dipping having taken place at a bath temperature of 70° C. and the soaking period being carried out at room temperature. For about an hour the linen is dried at a temperature of 50° C. and subsequently cured for fifteen minutes at a temperature of 110° C.

I claim:

1. A fibrous cellulosic composition treated with a small amount of phosphonium salt of the formula $$R^1R^2R^3\overset{\oplus}{P}CH_2CH_2OY \cdot X^{\ominus}$$

wherein
$R^1$, $R^2$, and $R^3$ each represent a member selected from the group consisting of alkyl $C_1$–$C_{16}$, substituted alkyl $C_1$–$C_{16}$, and cycloalkyl;
X represents halogen and;
Y represents the residue of an esterifying agent.

2. The composition of claim 1 in which the fibrous cellulosic material is cotton.

3. The composition of claim 1 in which the fibrous cellulosic material is paper.

4. The composition of claim 1 in which the fibrous cellulosic material is linen.

5. The composition of claim 1 in which the fibrous cellulosic material is wood.

6. The composition of claim 1 in which the fibrous cellulosic material is rayon.

7. A fibrous cellulosic composition treated with a small amount of phosphonium salt of the formula $$R^1R^2R^3\overset{\oplus}{P}CH=CH_2 \cdot X^{\ominus}$$

wherein $R^1$, $R^2$, and $R^3$ each represent a member selected from the group consisting of alkyl having from 4 to 16 carbon atoms, substituted alkyl having from 4 to 16 carbon atoms, cycloalkyl and naphthyl, said substituents for alkyl being selected from the group consisting of lower alkoxy and cyano, and X represents a member selected from the group consisting of halogen and tetraphenyl borate.

8. The composition of claim 7 in which the fibrous cellulosic material is cotton.

9. The composition of claim 7 in which the fibrous cellulosic material is paper.

10. The composition of claim 7 in which the fibrous cellulosic material is linen.

11. The composition of claim 7 in which the fibrous cellulosic material is wood.

12. The composition of claim 7 in which the fibrous cellulosic material is rayon.

13. The composition of claim 1 in which the phosphonium salt is 2-acetoxyethyltributyl phosphonium chloride.

14. The composition of claim 7 in which the phosphonium salt is a tributylvinylphosphonium halide.

15. A method which comprises treating a fibrous cellulosic composition with an aqueous solution containing 10% to 50% by weight, based on the dry weight of the cellulosic material, of a phosphonium salt of the formula

wherein
  $R^1$, $R^2$, and $R^3$ each represent a member selected from the group consisting of alkyl $C_1$–$C_{16}$, substituted alkyl $C_1$–$C_{16}$, and cycloalkyl;
  X represents halogen and;
  Y represents the residue of an esterifying agent.

16. The process of claim 15 in which said solution also contains from 1% to 5% of dilute alkali, based upon the dry weight of the phosphonium salt.

17. The process of claim 15 in which the fibrous cellulosic material is treated, allowed to dry, and then cured for a short period of time, said composition then containing from 1% to about 25% of said phosphonium salt.

References Cited

UNITED STATES PATENTS

| | | | |
|---|---|---|---|
| 2,201,814 | 5/1940 | Evans et al. | 8—84 |
| 2,743,232 | 4/1956 | Chance et al. | 8—120 |
| 2,933,367 | 4/1960 | Reeves et al. | 8—120 X |
| 2,990,233 | 6/1961 | Pacsu et al. | 8—116 |
| 3,251,642 | 5/1966 | Valentine et al. | 8—120 X |

OTHER REFERENCES

Gottlieb, Textile Research Journal, vol. 26, pp. 156–167 (1956).

NORMAN G. TORCHIN, *Primary Examiner.*

J. C. CANNON, *Assistant Examiner.*

U.S. Cl. X.R.

117—137; 8—84, 129; 260—231; 117—147, 154, 143, 144